Jan. 7, 1941.    S. F. BAYOUTH    2,227,818
PROCESS OF RAISING AND MEANS FOR HARVESTING SESAME
Filed July 3, 1939
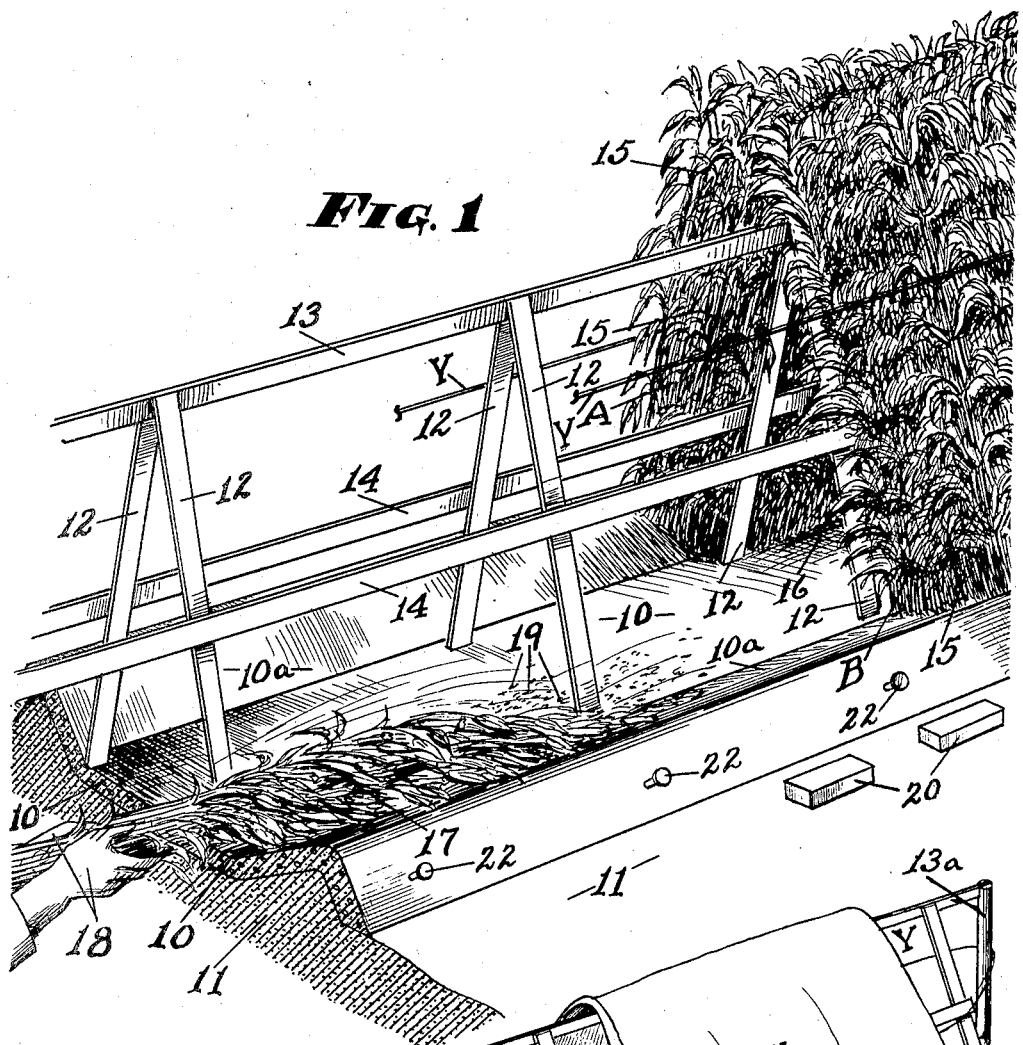
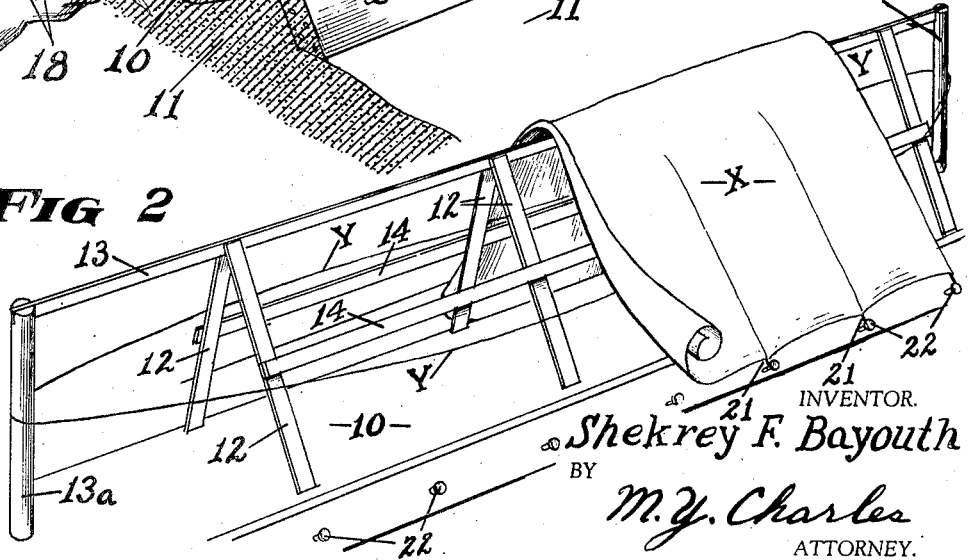
INVENTOR.
Shekrey F. Bayouth
BY
M. Y. Charles
ATTORNEY.

Patented Jan. 7, 1941

2,227,818

UNITED STATES PATENT OFFICE 2,227,818

PROCESS OF RAISING AND MEANS FOR HARVESTING SESAME

Shekrey F. Bayouth, Wichita, Kans.

Application July 3, 1939, Serial No. 282,647

1 Claim. (Cl. 47—58)

My invention relates to a process of raising, and means for harvesting sesame. Sesame is an herb or grass-like plant that is slender and grows to heights of six or eight feet or more. The plant develops a series of pods that are directed in an upwardly direction and contain seeds that are rich in oil and have a high food value for humans as well as animals.

It is a characteristic of the plant to grow and as it grows it will bloom and form pods and seed at various heights from the ground as the plant grows and as the plant reaches its final height there will be well developed and ripened seed at the lower portion of the plant while at the upper portion of the plant there will be green pods and unripened seed, and as the seed ripens the pods will open and the seed will readily fall out of the pods if the pods be inverted, therefore it is necessary that the pods all be maintained in an upright position until the seed has all ripened and is ready to be recovered from the pods.

In view of the above mentioned facts it will be seen that in order to save a hundred percent of the seed, or nearly so, it is desirable to cut the plant close to the ground about the time the first formed pods ripen and before the pods on the upper part of the plant are ripe in order to avoid the loss of seed from the ripened pods. Now if the plant is cut as just mentioned, and the seed is to be saved, the plant must still be maintained in its upright position until all the seed and pods have ripened and the pods have opened so that the seed may be easily recovered from the pod.

When all the seed and pods have ripened the plants can not be moved to amount to anything without loosing the seed from the pods, therefore it is not practical to try to load the plants on a wagon or truck to move them to some place for threshing and the like.

In view of the foregoing facts I have provided a means for taking care of the crop after it has been cut whereby practically a hundred percent of the seed may be recovered. The means I have provided for taking care of the crop and recovering the seed is as follows.

Now referring to the accompanying drawing,

Fig. 1 is a perspective view showing my improved means for taking care of the crop and recovering the seed therefrom, and also showing how the crop is held in the desired upright position until it is to be threshed.

Fig. 2 is a perspective view of the device employed in my invention to support the harvested crop, and illustrating how the crop may be tied to prevent it from being blown by the wind, from the supports, and also illustrating how the harvested crop may be covered as a protection from rain.

In the drawing is shown the means I have provided for taking care of the crop which comprises a trough like formation 10 which is made, preferably of concrete, although it can be made of wood or it may be formed by preparing mud from the ground and forming the trough on the ground 11. If the trough is formed of mud, the heat from the sun will bake the mud and form a hard surface for the trough. While a mud trough will answer the purpose, a more substantial trough such as concrete or wood would be preferable as will be made obvious as this description progresses. In forming the trough 10 it should slope slightly so as to drain any water therefrom that may be deposited by rain or otherwise.

In planting the crop, the seed may be broadcast or it may be planted in rows. It is preferable to plant the crop in rows so it can be cultivated and more easily taken care of and thereby obtain a larger yield of the seed.

After the crop has grown to the point where it is to be harvested, supports for the harvested crop are placed in the trough 10. The support is formed preferably of a series of pairs of inverted V-shaped leg elements 12 which support a ridge member 13 that terminates in posts 13a at either end of the support device, and one or more side support bars 14 against which the crop may be leaned after it has been cut as will later be explained.

When the crop is ready to be harvested, it may be cut with an ordinary corn harvester, or it may be cut by hand with a sickle or corn knife or other suitable cutting tool. Whatever method is employed in cutting the crop, care must be taken to keep the crop in an upright position and at no time should the crop be allowed to lay on the ground or lay over sideways because the seed would readily fall from that portion of the pods that might be ripe.

As the crop is cut it is immediately taken to the trough 10 where it is stood on end and leaned against the support members 13 and 14 as illustrated at 15 in such a manner as to provide a triangular shaped opening 16 as defined by the support legs 12 and the floor of the trough 10 between the opposing rows A and B of the harvested crop that is leaning against the support elements 13 and 14. This opening 16 provides a space for the circulation of air which will assist and hasten the belated ripening of the seed on the upper portion of the plant as is obvious.

In placing the harvested crop against the support elements 13 and 14, attention is called to the fact that the butt ends of the stalks rest on the inclined sides 10a of the trough formation. This arrangement of the harvested crop will prevent the lower ends of the stalks from standing in any water in time of rains and in case water should drain through the trough.

After the crop has been cut and leaned against the supports 13 and 14 as described and shown in Fig. 1, a wire or rope Y may be laid against the crop and pulled tight and wrapped or tied around the posts 13a so that the wind cannot blow the crop from the supports.

In case a rain should occur at a time when the crop should not be allowed to be wet, the crop could be protected by placing a canvas or tarpaulin X over the crop that is leaning against the supports 13 and 14 and thereby protect the crop from the rain or other undesirable hazards.

If a canvas or tarpaulin is used, it should be long enough that the edges would lay on the ground where bricks 20, or other objects, may be laid on the canvas or tarpaulin to hold it down so as to prevent the rain from wetting the crop. A preferable means of holding the canvas or tarpaulin X down is to provide the edges of the canvas or tarpaulin with strings 21 which may be tied to elements such as projecting bolts 22 that are cast in the concrete of the trough 10.

As has been previously mentioned, it is not desirable to try to move the crop after the seed and pods have ripened, therefore the crop should be threshed where it is. The threshing process is as follows:

The stalks are taken in small bunches 17 in the hands 18 of a person doing the threshing, and the bunch 17 is shaken and lightly beaten on the floor of the trough 10 whereupon practically all of the seed 19 will be shaken or threshed from the pod and deposited in the trough 10. As the threshing process progresses, the stalks A and B will be removed from the supports 13 and 14 and the supporting structure 12, 13 and 14 may be removed from the trough 10 whereupon the seed that has been threshed or shaken from the pods and is now lying on the floor of the trough 10 may be shovelled or scooped up and placed in a wagon or truck for transport purposes.

The seed having been thus recovered may be put through any one of numerous well known cleansing processes whereby the clean pure sesame seed may be obtained.

While I have shown and described the preferred form of my invention, it is to be understood that such modifications of my invention may be employed as lie within the scope of the appended claims without departing from the spirit and intention of my invention. Now having fully described my invention, I claim:

The process of raising, harvesting and threshing sesame, said process including the planting of the seed after which a harvesting trough is prepared adjacent the planted seed, and then placing a support in said trough for the support of the sesame stalks, and later harvesting the crop by cutting the stalks near the ground and then leaning the stalks against the said supports in such a manner that a continuous open space is maintained between the opposing rows of stalks leaned against the said support so as to permit the passage of a draft of air through said continuous open space to assist in the rapid drying and ripening process of the seed, and after the seed has ripened, threshing the seed from the seed pods by threshing the stalks on the floor of the trough substantially as shown and described.

SHEKREY F. BAYOUTH.